US012677751B2

(12) United States Patent
Kracht et al.

(10) Patent No.: US 12,677,751 B2
(45) Date of Patent: Jul. 14, 2026

(54) ROUND BALER

(71) Applicant: Maschinenfabrik Bernard Krone GmbH & Co. KG, Spelle (DE)

(72) Inventors: Katharina Kracht, Andervenne (DE); Felix Kalverkamp, Recklinghausen (DE)

(73) Assignee: Maschinenfabrik Bernard Krone GmbH & Co. KG, Spelle (DE)

( * ) Notice: Subject to any disclaimer, the term of this patent is extended or adjusted under 35 U.S.C. 154(b) by 371 days.

(21) Appl. No.: 18/477,829

(22) Filed: Sep. 29, 2023

(65) Prior Publication Data

US 2024/0114842 A1      Apr. 11, 2024

(30) Foreign Application Priority Data

Sep. 30, 2022    (DE) ......................... 102022125387.2

(51) Int. Cl.
A01F 15/07          (2006.01)

(52) U.S. Cl.
CPC .... A01F 15/0715 (2013.01); *A01F 2015/072* (2013.01)

(58) Field of Classification Search
CPC .. A01F 15/0715; A01F 15/07; A01F 15/0705; A01F 15/071; A01F 15/141; A01F 15/14; A01F 2015/143; B65B 57/04; B65B 11/04; B65B 41/16
See application file for complete search history.

(56) References Cited

U.S. PATENT DOCUMENTS

| | | | |
|---|---|---|---|
| 9,320,199 B2 | 4/2016 | Smith et al. | |
| 2016/0183474 A1 | 6/2016 | Thoreson et al. | |
| 2020/0205347 A1* | 7/2020 | Baker | A01F 15/106 |
| 2020/0323144 A1 | 10/2020 | Lebeau et al. | |
| 2022/0217912 A1* | 7/2022 | Varley | A01F 15/0705 |

FOREIGN PATENT DOCUMENTS

| | | |
|---|---|---|
| DE | 202019105334 U1 | 1/2021 |
| EP | 2932821 A1 | 10/2015 |
| EP | 3785521 A1 | 3/2021 |

* cited by examiner

*Primary Examiner* — Joseph M Rocca
*Assistant Examiner* — Robert E Pezzuto
(74) *Attorney, Agent, or Firm* — McKee, Voorhees & Sease, PLC

(57) ABSTRACT

The invention relates to a round baler (1), having a pressing apparatus (9) for pressing agricultural crops into a bale (50) in a pressing chamber (13), and a binding unit (20), having a binding housing (21), a plurality of roll receptacles (22, 26) which are at least partially arranged in the binding housing (21) and which are each intended to rotatably receive a binding material roll (42, 43), a feed unit (30) by which binding material (44, 45) from a respective active roll receptacle (22, 26), which can be selected from the plurality of roll receptacles (22, 26), can be introduced in the direction of the pressing chamber (13), and a brake unit (35) configured to at least indirectly cooperate with a binding material roll (42, 43) so as to brake it. The number of components and the effort involved in changing between different binding materials are optimized.

14 Claims, 5 Drawing Sheets

ROUND BALER

CROSS REFERENCE TO RELATED APPLICATIONS

This application claims priority under 35 U.S.C. § 119 to German Patent Application DE 10 2022 125 387.2, filed Sep. 30, 2022, which is herein incorporated by reference in its entirety, including without limitation, the specification, claims, and abstract, as well as any figures, tables, appendices, or drawings thereof.

FIELD OF THE INVENTION

The present invention relates to a round baler.

BACKGROUND OF THE INVENTION

The background description provided herein gives context for the present disclosure. Work of the presently named inventors and aspects of the description that may not otherwise qualify as prior art at the time of filing are neither expressly nor impliedly admitted as prior art.

Round balers are used in agriculture to pick up crops such as hay or straw and to press them into bales. The crop is picked up from the ground (for example, by a pickup), conveyed further, usually chopped up (for example, by means of a cutting rotor), and finally pressed in a pressing chamber to form round crop bales, which are then wrapped with a binding material. Round balers regularly have a binding unit that is designed to receive a binding material roll or the like and to feed the binding material to the pressing chamber, for example, by means of a movable feed jaw, which grasps an end of the binding material. The fed-in binding material can then be used to bind the pressed bale. The binding material used may be twines, nets, or (for example, in the case of grass) films, wherein it is also possible for the latter to be applied outside the round baler in a bale wrapper, which is separate therefrom.

Round balers having a plurality of binding units are also known, wherein, for example, different types of binding material can be used. What is known as a double binding system consists of two complete binding units. This means two binding material rolls are provided, and a separate feed unit for each binding unit. Furthermore, further components are usually provided for each binding unit, for example, a brake unit which slows down the unrolling of the binding material and thus tautens the strand of binding material, and a gathering unit which gathers the strand of binding material together laterally upstream of the pressing chamber. The double binding system is at least largely redundant in this respect; normally, all components are present twice, but in some models, the gathering unit is shared by both binding units. The changing of the binding material is possible in a remotely controlled or fully automatic manner and does not require any further adjustment on the machine. However, due to the components, which are present twice, this configuration is cost-intensive and increases the weight of the round baler.

A more cost-effective variant is the 1.5 binding system. In this case, two binding material rolls, each having its own brake unit, can be provided, but only one feed unit, via which the binding material is guided from a respective one of the binding material rolls to the pressing chamber. A change of material does not require exchanging of the binding material roll; however, the loose end of the binding material must, in each case, be threaded into the feed unit during the change. In addition, the brake unit, which is present twice, increases the weight and costs. Another variant of the 1.5 binding system also provides only one feed unit, but the binding material rolls can be pivoted like a revolver and can be alternately coupled to a single brake unit (for example, via a pair of gears). The braking force is usually introduced into the binding material roll via the roll core, which often consists of cardboard. According to one configuration, claws engage into the roll core, which can lead to fraying, and therefore, the braking action decreases or is lost completely. Rain or high humidity can cause the roll core to soften, which also leads to the loss of the braking action. In the case of cores composed of plastic, which are also known, the claws generally cannot grip sufficiently, and the braking force cannot be transmitted. Another disadvantage of this system is the complex pivoting of the binding material rolls, which have a considerable mass, typically between 50 kilograms and 100 kilograms.

Therefore, there is a strong need to optimize both the number of components and the effort involved in changing between different binding materials in a round baler.

SUMMARY OF THE INVENTION

The following objects, features, advantages, aspects, and/or embodiments are not exhaustive and do not limit the overall disclosure. No single embodiment needs to provide each and every object, feature, or advantage. Any of the objects, features, advantages, aspects, and/or embodiments disclosed herein can be integrated with one another, either in full or in part.

It is a primary object, feature, and/or advantage of the present invention to improve on or overcome the deficiencies in the art.

For this purpose, a round baler is provided, having a pressing apparatus for pressing agricultural crops into a bale in a pressing chamber, and a binding unit, having a binding housing, a plurality of roll receptacles which are at least partially arranged in the binding housing and which are each intended to rotatably receive a binding material roll, a feed unit by which binding material from a respective active roll receptacle, which can be selected from the plurality of roll receptacles, can be introduced in the direction of the pressing chamber, and a brake unit which is configured to at least indirectly cooperate with a binding material roll so as to brake it.

The round baler is designed to press agricultural crops into (round) bales. It can be self-propelled or be intended to be towed by a tractor. The agricultural crop may, in particular, be stalk material such as grass, straw, or hay, but also, for example, chopped corn. Said round baler usually has a frame which, as it were, forms the basic structure of the round baler and gives it stability overall. The running wheels of the round baler are also connected to the frame via a suitable mount, as is—in the case of a towed configuration—a drawbar. In addition, the frame typically has a housing which outwardly shields the internal parts, namely the pressing apparatus. The actual pressing operation is effected within the pressing chamber by the pressing apparatus, which may be arranged at least partially, possibly even completely, within a frame. The pressing chamber, in which the bale is formed and pressed, is at least partially delimited or defined by the pressing apparatus. The pressing apparatus typically has at least one pressing element (usually a plurality of pressing elements), which can be moved in relation to the frame. The crop can be picked up by means of a pickup and conveyed further in the direction of the pressing chamber by means of a conveying apparatus, for example, a feed rotor. Instead of or in addition to a simple conveying apparatus, a cutting apparatus may be provided, which not only conveys the crop onwards but also cuts it. Usually, the round baler has a feed channel through which the stream of crop passes before it reaches the pressing chamber.

Furthermore, the round baler has a binding unit. This is used to initiate a binding operation, in which a bale, after it has been formed, is provided with binding material, for example, with at least one twine, a net, or a film. The binding unit may be arranged at the front of the pressing chamber with respect to a longitudinal axis; that is to say, the binding unit may be arranged on or in front of the front of the pressing chamber in a direction of travel. However, other arrangements are also conceivable, for example, above the pressing chamber and/or at the rear of the pressing chamber with respect to the longitudinal axis. The binding unit has a binding housing. This forms a stable framework on which other components of the binding unit can be arranged in a rigid or movable manner. The housing is usually designed to be inherently rigid and may consist of a plurality of rigidly connected parts. The term "housing" should not be interpreted as meaning that it must be predominantly closed. Reference may also be made to a binding frame. In some embodiments, the binding housing is clearly differentiated, in particular from an above-mentioned housing that encloses the pressing chamber. In other embodiments, these two housings may at least partially be formed in one piece with one another. They may merge into one another without a clear differentiation. In this case, the binding housing forms a portion or part of an overall housing. Accordingly, embodiments in which the binding housing is at least partially formed in one piece with the above-mentioned frame of the round baler are also conceivable.

Furthermore, the binding unit has a plurality of roll receptacles, which are at least partially arranged in the binding housing, and which are each intended to rotatably receive a binding material roll. The respective roll receptacle is configured to receive a binding material roll. The binding material roll, which strictly speaking is not part of the binding unit, usually has a cylindrical roll core, which may, for example, consist of cardboard or plastic. The binding material, for example, a net or a film, is wound onto this roll core. Overall, the binding material roll is usually of approximately cylindrical shape, the actual shape possibly also being dependent on how much binding material has already been unwound. The roll receptacle is designed in such a way that the binding material roll can be received in a rotatable manner; that is to say, the binding material roll can be rotated about a binding material roll axis, which may correspond to an axis of symmetry of the binding material roll. Typically, this binding material roll axis runs parallel to a transverse axis of the round baler. The roll receptacle may be arranged entirely or partially within the binding housing. Overall, the binding unit has a plurality of roll receptacles, such that overall, a plurality of binding material rolls can be received at the same time. In the operating state, the individual binding material rolls could comprise the same binding material or different types of binding material.

Furthermore, a feed unit is provided, by which binding material from a respective active roll receptacle, which can be selected from the plurality of roll receptacles, can be introduced in the direction of the pressing chamber. The feed unit introduces the binding material (from the binding material roll in the active roll receptacle) in the direction of the pressing chamber, that is to say, towards the pressing chamber, such that there the bale can be bound or wrapped with the binding material. Here, it is not necessary for the feed unit to guide the binding material directly to or even into the pressing chamber. Part of the feeding may be effected by another element (for example, a pressing element), to which the feed unit, as it were, hands over the binding material. The binding material removed from the binding material roll is usually conducted via one or more deflection rolls, which form part of the feed unit. The respectively active roll receptacle can be selected by the user, depending on which of the binding material rolls is currently intended to be used. In each case, the same feed unit is used, irrespective of which roll receptacle is currently active. It can be said that the feed unit is able to be used alternately in combination with a respective one of the roll receptacles. The feed unit may have drive means which can be used to actively convey the binding material. However, such drive means are not absolutely necessary and correspondingly are also not provided in some embodiments. Rather, the binding material may be entrained by the bale rotating in the pressing chamber, after one end of the strand of binding material has come into contact with the bale.

The feed unit may be able to be at least partially adjusted in relation to the binding housing and have a holding apparatus which is designed to hold an end region of the binding material and to introduce it into the pressing chamber. The holding apparatus may, for example, be in the form of a feed jaw, which comprises two clamping elements such as metal sheets and/or rubber blankets which run towards one another and between which an end region of the binding material can be clamped. The feed apparatus may be at least partially in the form of a feed pendulum, wherein the holding apparatus—for example, together with one or more deflection rolls—is arranged on a carrier, which is connected to the binding housing via two pivot arms. It goes without saying that an actuator is required to adjust the feed unit. In this case, the feed unit can be adjusted between an extended position, in which the binding material is introduced into the pressing chamber, and a retracted position, in which the feed unit can be arranged compactly on the rest of the binding unit.

In addition, the binding unit has a brake unit, which is configured to at least indirectly cooperate with a binding material roll so as to brake it. The brake unit is configured to cooperate with the binding material roll either directly or indirectly, in which case the brake unit and the binding material roll cooperate via at least one interposed element. The cooperation generates a braking force and/or a braking torque on the binding material roll. Here, it is possible that the braking force is exerted only to a small extent, if at all, by the brake unit itself. The brake unit could, for example, push the binding material roll against an element, such that a frictional force is generated between this element and the binding material roll and brakes the binding material roll. The brake unit is used to brake and stretch the binding material during the unrolling. Here, braking of the binding material roll also includes holding fast the binding material roll; that is to say, the brake unit may be configured to temporarily completely prevent rotation of the binding material roll. The braking action, which the brake unit at least indirectly exerts on the binding material roll, is usually variable. That is to say that it can be temporarily increased or reduced.

In addition to the above-mentioned components, the binding unit may also have further components, for example, a filling device, which assists refilling of binding material rolls, a restraining bracket, which secures the stocked binding material in the binding material receptacle, a gathering apparatus, etc. The round baler may have a binding material knife for cutting binding material, the knife being connected to the frame independently of the at least one binding unit. The binding material knife is usually movably connected to the frame of the round baler. As an alternative, it is also possible for the binding unit to have a binding material knife, which can be connected, for example, to the feed unit and can possibly be able to be adjusted therewith.

According to the invention, the brake unit can be adjusted relative to the binding housing between a plurality of braking positions, wherein each roll receptacle is assigned at least one braking position, and, in a braking position assigned to a roll receptacle, the brake unit is configured to at least indirectly cooperate with the binding material roll received in this roll receptacle in order to brake it. The brake unit is thus not arranged on the binding housing in a stationary manner, but can be adjusted. This explicitly includes the possibility that the brake unit is only partially adjustable, while the part remains stationary. In each case, it can assume a plurality of braking positions. Each roll receptacle is assigned at least one braking position. In this context, the assignment is reciprocal; thus, each braking position is assigned to a roll receptacle. The number of braking positions usually corresponds to the number of roll receptacles; however, it would also be conceivable for a roll receptacle to be assigned a plurality of braking positions. The braking position assigned to a roll receptacle may, in particular, be that braking position in which the brake unit is arranged closest to this roll receptacle, but this is not necessarily the case. In each case, it is possible for the brake unit to be adjusted into a respective braking position assigned to the active roll receptacle. The brake unit can, in each case, at least indirectly cooperate with the binding material roll arranged in the roll receptacle to which the braking position is assigned. It is optionally possible for a locking mechanism to be provided, in order to secure the brake unit in the respective braking position. Embodiments in which the brake unit can at least indirectly cooperate with the respective binding material roll not in an exactly defined position but rather in a certain position range are also conceivable. The exact braking position could be dependent, for example, on the current size of the binding material roll. In this case, strictly speaking, reference should be made to a braking position range, but this is intended to also be encompassed here and in the following text by the term "braking position."

To change from one binding material roll to another, the roll receptacles with the binding material rolls received therein can remain in defined positions on the binding housing, while the brake unit is adjusted in a suitable manner. As will be explained further below, in some embodiments, a minor displacement of the binding material roll may be necessary, but this is also readily manageable manually for the user. In any case, a substantial displacement of the heavy binding material rolls is not necessary. The brake unit, for its part, can be of comparatively light design, and, therefore, the user is also able to adjust it manually without significant effort. However, it would also be possible to provide an actuator, which can be used to adjust the brake unit. The change between different binding material rolls is easy to carry out overall, wherein the round baler, according to the invention, manages with a small number of components and can, therefore, be implemented in an easy and cost-effective manner. In particular, in spite of a plurality of binding material rolls, only a single brake unit and a single feed unit are necessary. When activating a roll receptacle, the user merely has to unwind the strand of binding material from the corresponding binding material roll a little and, introduce it into the feed unit, and possibly guide it therethrough.

In the context of the invention, different types of brake units or different brake mechanisms are possible. For example, the brake unit, by way of a rotatable element, could engage on, in particular, into, a roll core. In this case, a frictional engagement and/or form-fitting engagement can be produced, the latter in particular with deformation of the roll core. The rotatable element, which may, for example, have claws, can, for its part, be coupled to a brake. A preferred configuration provides for the brake unit to have a brake roll which is mounted so as to be rotatable about a brake roll axis of rotation and which is configured to engage radially on the outer side of the binding material roll in order to brake it. The brake roll engages radially on the outer side of the binding material roll, that is to say, radially on the outer side with respect to the binding material roll axis. The engagement is thus effected on the outer surface or lateral surface of the binding material roll. It can also be said that the lateral surfaces of the binding material roll and of the brake roll cooperate with one another. Here, a frictional engagement is generally provided between the binding material roll and the brake roll. It is, for example, possible to promote said frictional engagement by virtue of the brake roll being formed from an elastomer, in particular rubber, at least in the region of its lateral surface. On the one hand, such a material provides a high coefficient of friction, and, on the other hand, owing to its elasticity, it can adapt to the binding material roll, which can enlarge the bearing surface and also prevent damage to the binding material. The brake roll may have a cylindrical lateral surface; however, deviations from a pure cylinder shape are also conceivable. The actual generation of the braking force can be effected by the brake unit. However, it would also be possible for the brake roll to push the binding material roll against a further element, for example, a stationary holding element, such that a frictional force between this element and the binding material roll is generated or at least substantially increased.

The brake roll can preferably be adjusted, guided along a defined adjustment path, between two braking positions. If more than two braking positions are provided, this usually applies to each pair of braking positions. The adjustment path may describe, for example, the movement of the center of gravity and/or center of the brake roll. The adjustment path is defined; that is to say, the brake roll is able to move from one braking position to the other braking position only along the adjustment path. Here, play that is always inherently present is disregarded. The adjustment movement is guided; that is to say, the brake roll and the binding housing cooperate with one another via a guide. In this case, the guide may at least partially be formed by the binding housing and/or the brake unit.

The adjustability of the brake roll may be implemented in different ways, for example, by a translational, possibly even rectilinear displacement. One configuration provides for the brake roll to be able to be adjusted along an at least partially arcuate adjustment path. The adjustment path may also be of overall arcuate shape. The curvature of the adjustment path may be variable or constant. In the latter case, the adjustment path is in the shape of a circular arc and can be described by a rotation about an axis that is stationary with respect to the binding housing. Usually, the at least partially arcuate adjustment path is defined by a guide, for example, a guide slot, at least one guide arm, or other suitable guide elements. The at least partially arcuate adjustment path generally enables a better approximation to the braking position and to the binding material roll than a rectilinear adjustment path.

In particular, a circular-arc-shaped adjustment path can be implemented by virtue of the brake unit having a brake mount on which the brake roll is mounted so as to be rotatable about the brake roll axis of rotation and which is mounted on the binding housing so as to be pivotable about a brake unit pivot axis which is offset relative to the brake roll axis of rotation. This configuration is particularly advantageous if exactly two roll receptacles are provided. The brake mount may be of one-part or multi-part design. For example, it may have two parts arranged on opposite sides of the brake roll. The brake mount is preferably of an inherently rigid design. However, it can be pivoted in relation to the binding housing. In this case, the corresponding brake unit pivot axis usually runs parallel to the transverse axis of the round baler. Equally, the brake unit pivot axis and the brake roll axis of rotation generally run parallel to one another.

In order to produce a frictional engagement between the brake roll and the binding material roll, a pressing force has to act between the two rolls. This could be generated, for example, by a spring element or an actuator, which preloads the brake roll against the binding material roll. However, it is also possible for the pressing force to be generated by the weight force of the binding material roll. According to such a configuration, in the respective braking position, the brake roll is configured to at least partially support the binding material roll received in the roll receptacle. This, of course, relates to the roll receptacle to which the braking position is assigned.

Conversely, the binding material roll received in the roll receptacle is at least partially supported on the brake roll. This means the weight force of the binding material roll is at least partially absorbed by the brake roll. In addition, the brake roll can also absorb horizontal force components. In the case of a partial absorption of the weight force, the roll receptacle has at least one further support element which absorbs the remaining part of the weight force.

One configuration provides for at least one roll receptacle to have a support roll, which is mounted on the binding housing in a positionally fixed manner, and which is configured to support the binding material roll together with the brake roll. The support roll is mounted on the binding housing so as to be rotatable about a support roll axis of rotation, which generally also runs parallel to the transverse axis of the round baler. The support roll axis of rotation is generally arranged on the binding housing in a stationary manner. Like the brake roll, the support roll absorbs part of the weight force of the binding material roll, wherein the weight force can be distributed in equal parts or unequally. In a horizontal direction, more precisely in a direction of the longitudinal axis of the round baler, the support roll and the brake roll are arranged on different sides of the center of gravity of the binding material roll. Arranged between them is usually a certain region of the binding material roll that is not directly supported. When the binding material roll rotates, the support roll is passively co-rotated, wherein, in contrast to the brake roll, it is harmless if the support roll is not always carried along, that is to say, if slip occurs. Instead of a rotatable support roll, it would also be possible to use a non-rotatable support element, the surface of which forms only a small coefficient of friction with the binding material, such that the binding material roll can slide over the support element without significant resistance.

In so far as the brake roll completely or partially supports the binding material roll in the corresponding braking position, there is the problem of how the binding material roll can be secured when the brake roll is adjusted. According to one configuration, at least one roll receptacle has an auxiliary support apparatus, which is configured to at least partially support the binding material roll when the brake roll is arranged outside the assigned braking position. Usually, this is combined with an embodiment in which the brake roll partially supports the binding material roll in the braking position. In this case, the auxiliary support apparatus also partially supports the binding material roll, while at least one further support element, for example, the above-mentioned support roll, absorbs the remaining weight force.

One configuration provides for at least one auxiliary support apparatus to have a plurality of support fingers, which are spaced apart parallel to the brake roll axis of rotation, and which are configured to support the binding material roll in each case proportionately. 2 to 4 support fingers are usually provided, but a greater number would also be possible. The support fingers are each spaced apart parallel to the brake roll axis of rotation, that is to say, generally parallel to the transverse axis of the round baler. The support fingers of an auxiliary support apparatus are usually of identical design and/or are arranged along the brake roll axis of rotation in a symmetrical manner with respect to a perpendicular central plane, which may correspond, for example, to the longitudinal central plane of the round baler. Typically, the support fingers are intended to absorb equal proportions of the weight force of the binding material roll.

Embodiments in which the auxiliary support apparatus is movably connected to the binding housing are conceivable. In this case, it would even be conceivable for the auxiliary support apparatus to be able to be adjusted (by actuators or manually) between a support position and a passive position. However, in order for the construction of the binding unit to be kept as simple and stable as possible, it is preferable for the auxiliary support apparatus to be rigidly connected to the binding housing. This means the auxiliary support apparatus always remains in the same position in relation to the binding housing, apart from any possible elastic deformation. If the auxiliary support apparatus has a plurality of support fingers as described above, all the support fingers are rigidly connected to the binding housing, the connection being able to be direct or indirect.

In particular, but not exclusively, in the above-mentioned configuration, a spatial conflict between the brake roll and the auxiliary support apparatus could possibly occur. Such a conflict can be avoided or resolved in different ways. One configuration provides for the brake roll to have at least one cutout, which runs in an encircling fashion tangentially with respect to the brake roll axis of rotation, which is axially delimited, which extends radially inwards, and in which the auxiliary support apparatus is at least partially received in at least one position of the brake roll. The respective cutout can also be referred to as indentation. In the region of the cutout, the contour of the brake roll recedes radially inwards, which means a deviation from a cylindrical shape. The shapes of the auxiliary support apparatus and of the at least one cutout are coordinated such that at least a part of the auxiliary support apparatus is arranged in the cutout in at least one position of the brake roll. It could also be said that the auxiliary support apparatus engages into the at least one cutout in the corresponding position. In particular, this may be the case in a braking position, but it is instead or additionally also possible for it to be a position between two braking positions. If the auxiliary support apparatus has a plurality of support fingers, a cutout can be provided for each support finger. Overall, in this case, the brake roll has a plurality of cutouts, which are axially spaced apart with respect to the brake roll axis of rotation. However, an outermost support finger could also be arranged to the side of the brake roll, such that the number of cutouts is lower than the number of support fingers.

In the braking position, the brake roll preferably protrudes beyond the auxiliary support apparatus in the direction of the binding material roll, such that the auxiliary support apparatus is completely relieved of load. If the binding material roll axis, that is to say, the axis of symmetry of the binding material roll, is considered in the braking position, the (minimum) radial distance of the brake roll is lower than the (minimum) radial distance of the auxiliary support apparatus. Accordingly, the brake roll prevents contact between the auxiliary support apparatus and the binding material roll. While the brake roll completely or partially absorbs the weight force of the binding material roll, the auxiliary support apparatus is completely relieved of load. Accordingly, there is also no friction between the binding material roll and the auxiliary support apparatus.

The path, along which the binding material from the respective roll receptacle is guided in the direction of the pressing chamber, has a different starting point depending on the selected active roll receptacle and thus differs at least in part. In general, a plurality of guide elements, such as deflection rolls, are required in order to feed the binding material to the pressing chamber in the intended manner. Depending on the configuration of the binding unit and arrangement of the roll receptacles, it would be possible to provide different guide elements, depending on which roll receptacle is active. However, this is generally undesirable, since this increases the number of components and the overall weight. It is, therefore, preferable for the feed unit to have a plurality of guide elements for binding material, which are at least predominantly able to be used together with any desired active roll receptacle. This means the respective guide elements can be used to guide the binding material, irrespective of which roll receptacle is active. This particularly preferably applies to all the guide elements.

Furthermore, the object is achieved by means of a binding unit for a round baler which has a pressing apparatus for pressing agricultural crops into a bale in a pressing chamber, wherein the binding unit has a binding housing, a plurality of roll receptacles which are at least partially arranged in the binding housing and which are each intended to rotatably receive a binding material roll, a feed unit by which binding material from a respective active roll receptacle, which can be selected from the plurality of roll receptacles, can be introduced in the direction of the pressing chamber, and a brake unit which is configured to at least indirectly cooperate with a binding material roll so as to brake it.

According to the invention, the brake unit can be adjusted relative to the binding housing between a plurality of braking positions, wherein each roll receptacle is assigned at least one braking position, and, in a braking position assigned to a roll receptacle, the brake unit is configured to at least indirectly cooperate with the binding material roll received in this roll receptacle in order to brake it.

The mentioned terms have already been explained with reference to the round baler according to the invention and will, therefore, not be explained again. Preferred configurations of the binding unit according to the invention correspond to those of the round baler according to the invention. It is expressly pointed out that the above-described embodiments of the invention can be combined in each case individually, but also in any combinations with one another, with the subject matter of the main claim, provided that no technically compelling obstacles are in conflict therewith.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

Further modifications and embodiments of the invention can be derived from the following description of the subject matter and the drawings.

The invention will be described below on the basis of figures. The figures are merely exemplary and do not restrict the general concept of the invention. In the figures:

BRIEF DESCRIPTION OF THE DRAWINGS

Several embodiments in which the present invention can be practiced are illustrated and described in detail, wherein like reference characters represent like components throughout the several views. The drawings are presented for exemplary purposes and may not be to scale unless otherwise indicated. Further details and advantages of the invention can be found in the schematic figures described below.

The invention is described below with reference to Figures. The Figures or FIGS. are purely exemplary and do not limit the general notion of the invention. In the drawings.

An artisan of ordinary skill in the art need not view, within isolated figure(s), the near infinite number of distinct permutations of features described in the following detailed description to facilitate an understanding of the present invention.

DETAILED DESCRIPTION OF THE INVENTION

The present disclosure is not to be limited to that described herein. Mechanical, electrical, chemical, procedural, and/or other changes can be made without departing from the spirit and scope of the present invention. No features shown or described are essential to permit basic operation of the present invention unless otherwise indicated. The hereinafter elucidated features may also be an aspect of the invention individually or in combinations other than those shown or described, but always at least in combination with the features of the claims. Where appropriate, functionally equivalent parts are provided with identical reference numbers.

Figure 1:
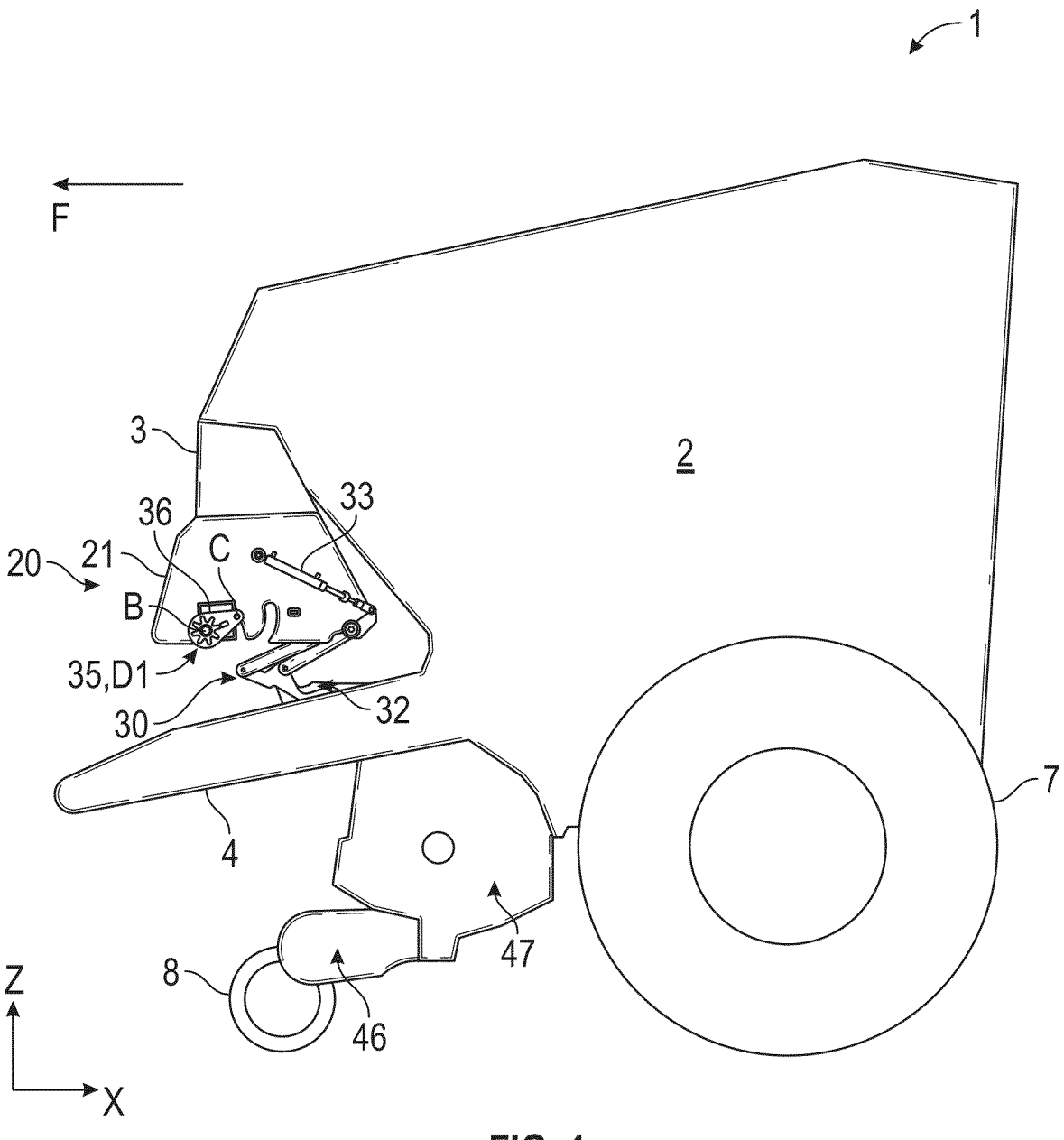
FIG. 1 shows a side view of a first round baler according to the invention with a binding unit according to the invention.
Figure 2:
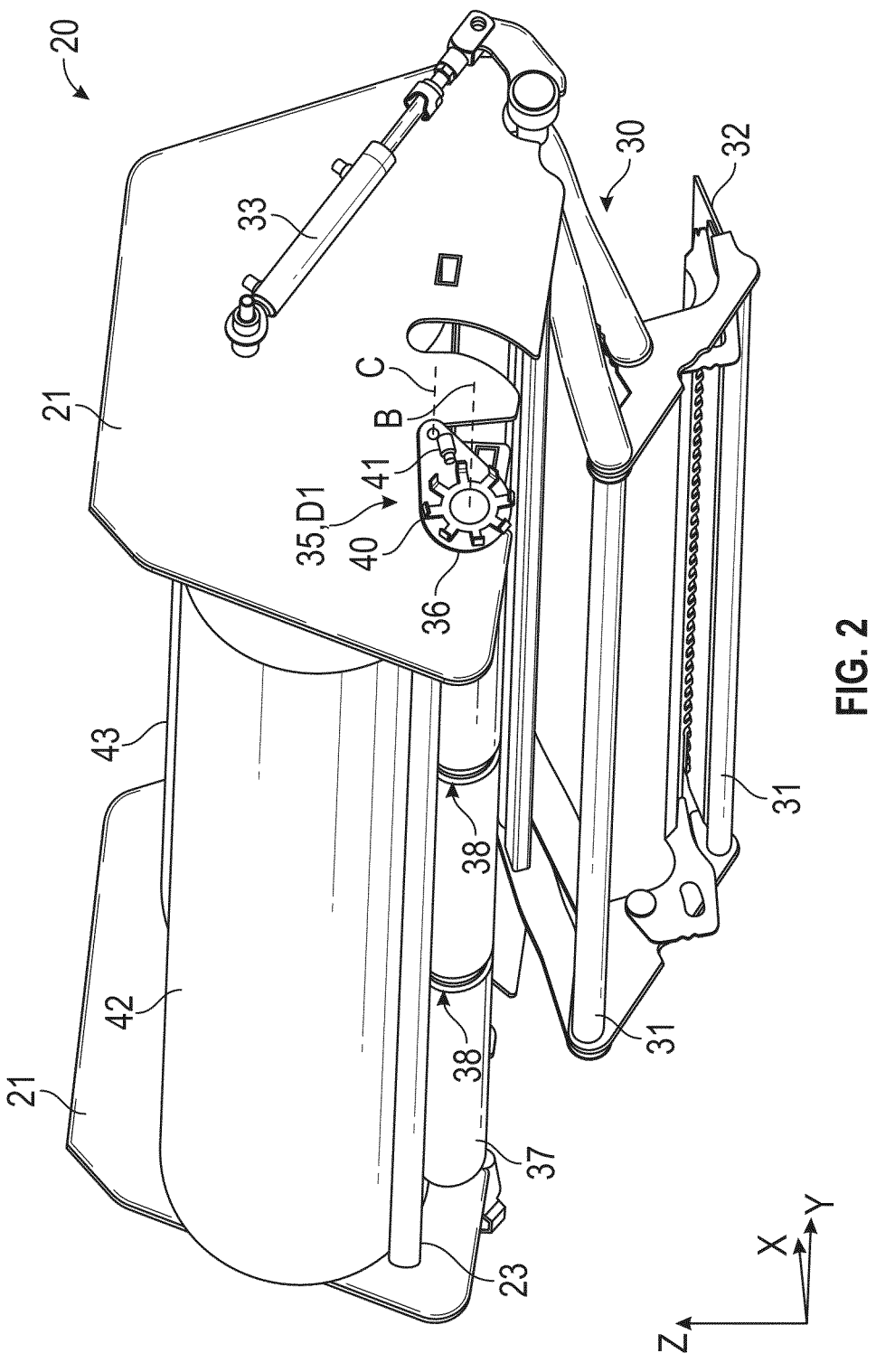
FIG. 2 shows a perspective illustration of the binding unit from FIG. 1.
Figure 3:
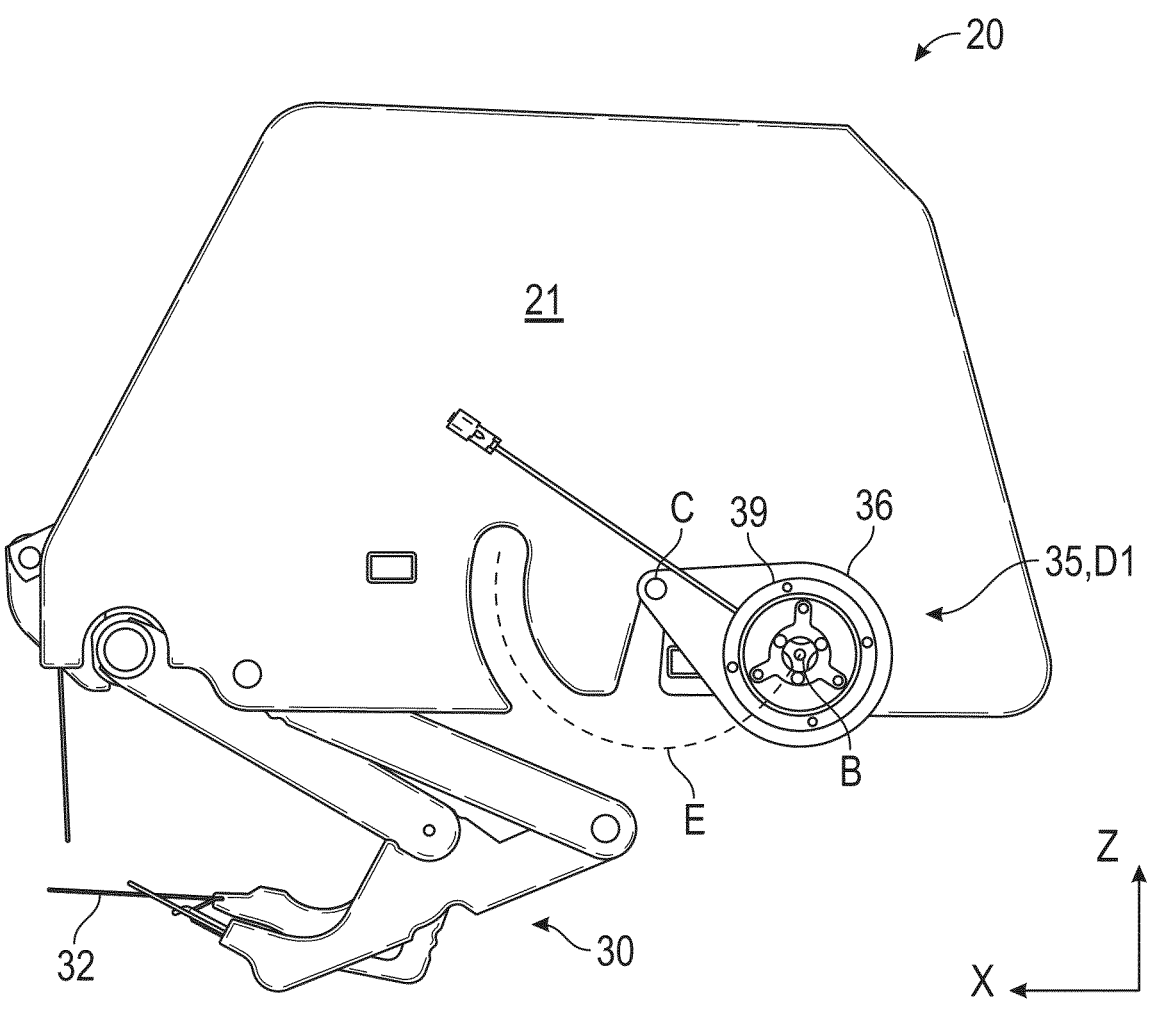
FIG. 3 shows a side view of the binding unit from FIG. 1.

FIGS. 1-5 show a first embodiment of a round baler 1 according to the invention. This has a frame 2, which gives it structural stability overall. The frame 2 is supported on running wheels 7 (illustrated schematically here). A drawbar 4 is arranged at the front on the frame 2 in a direction of travel F and can be used to connect the round baler 1 to a tractor (not illustrated here). In the figures, in each case, a longitudinal axis X pointing rearwards counter to the direction of travel F, a transverse axis Y pointing to the right as seen in the direction of travel, and an upwardly pointing vertical axis Z of the round baler 1 are depicted. The illustration in FIG. 1 is simplified, and various elements, that are not essential to the present invention have been omitted or have not been provided with reference designations. This includes a pickup 46, which is supported on auxiliary wheels 8 and is used to pick up crops from the ground and convey them further via a feed channel to a feed rotor 47. The feed rotor 47, which may also be in the form of a cutting rotor, conveys the crop further through the feed channel to a pressing chamber 13 within the frame 2 (see FIGS. 4 and 5). The pressing chamber 13 is formed by a pressing apparatus 9, of which two rollers 10, 11 and a plurality of pressing belts 12 are illustrated. The pressing belts 12 are guided in a suitable manner by guide rolls, which are not illustrated here for reasons of clarity.

Figure 4:
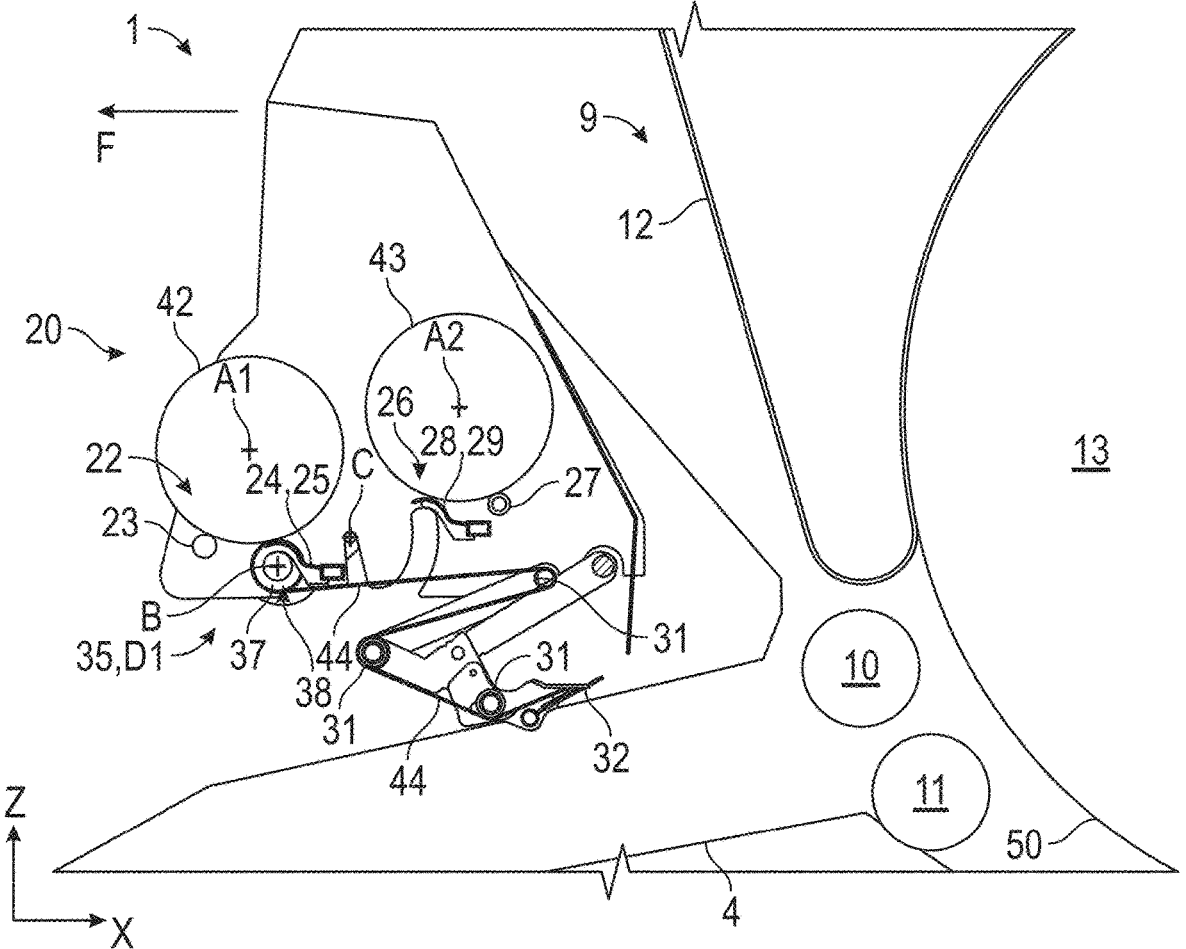
FIG. 4 shows a lateral sectional illustration of part of the round baler from FIG. 1 in a first state.
Figure 5:
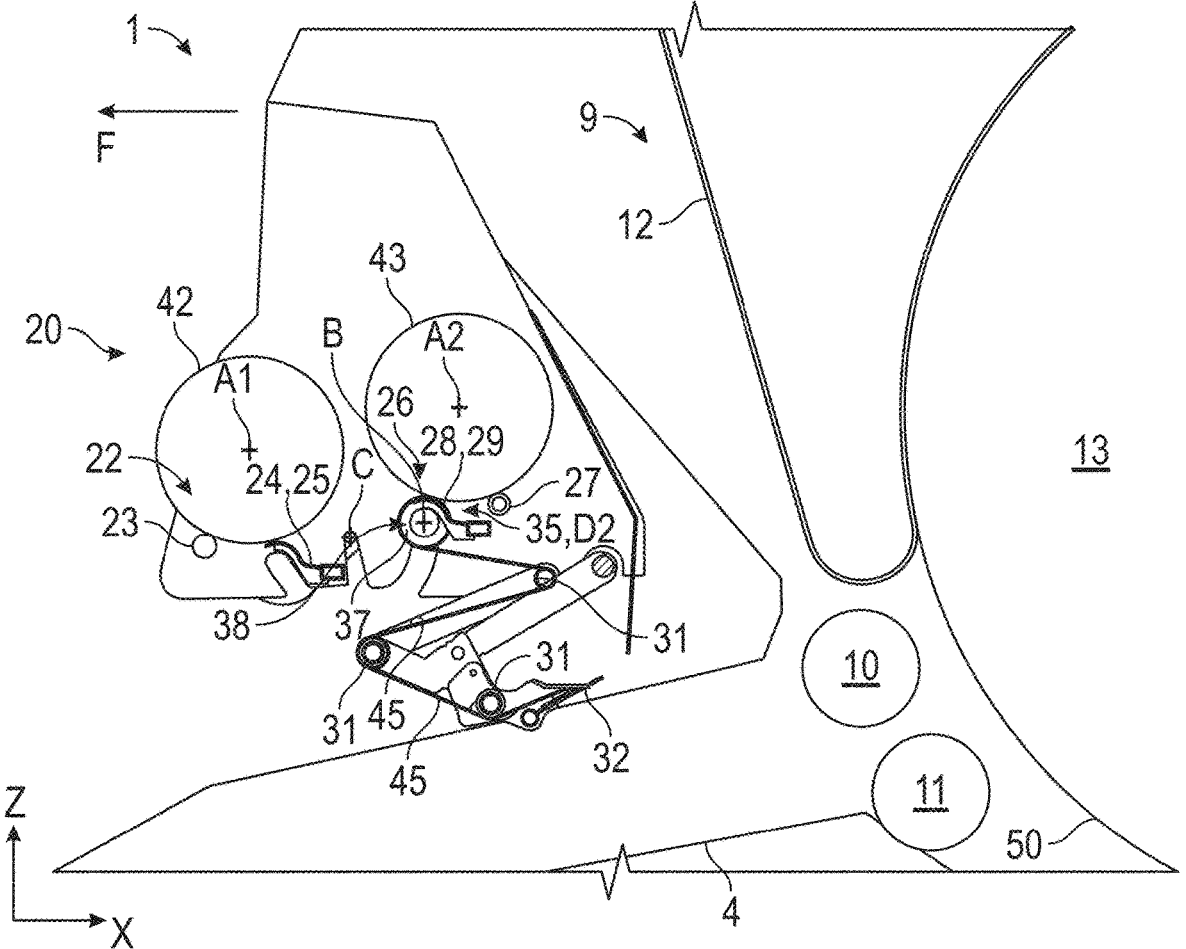
FIG. 5 shows a lateral sectional illustration of part of the round baler from FIG. 1 in a second state.

FIGS. 4 and 5 illustrate a finished bale 50, crops having been compressed in the pressing chamber 13 to form said bale. Before the bale 50 is ejected, it is wrapped with binding material 44, 45, for which the round baler has a binding unit 20. The binding unit 20 has a binding housing 21 in which a first roll receptacle 22 and a second roll receptacle 26 are arranged. Each of the roll receptacles 22, 26 is designed to rotatably receive a binding material roll 42, 43. In order to support the binding material roll 42, 43, the respective roll receptacle 22, 26 in each case, has a support roll 23, 27 and an auxiliary support apparatus 24, 28. The auxiliary support apparatus 24, 28 has a plurality of support fingers 25, 29, which are rigidly connected to the binding housing 21 and are spaced apart in the direction of the transverse axis Y.

By way of a feed unit 30, which has a feed pendulum with a feed jaw 32 arranged at the end, binding material 44, 45, which has been unwound from one of the binding material rolls 42, 43 can be guided in the direction of the pressing chamber 13. By means of an actuator 33, the feed pendulum can be moved rearwards counter to the direction of travel F, such that the feed jaw 32 protrudes into the region between the rotating rollers 10, 11 (not illustrated in the figures). There, the binding material 44, 45 can be entrained by one of the rollers 10, 11, and by the rotating bale 50, with the result that it is wrapped around the bale 50. In order to guide the binding material 44, 45, the feed unit 30 has a plurality of deflection rolls 31. FIG. 4 shows a state in which the first receptacle 22 is active; thus, binding material 44 from the binding material roll 42 received therein is used. By contrast, FIG. 5 shows a state in which the second roll receptacle 26 is active, and thus, binding material 45 from the binding material roll 43 received therein is used. Here, it is readily apparent that the deflection rolls 31 and the feed jaw 32 can be used in both cases. This means the feed unit 30 can be used together with any desired roll receptacle 22, 26.

The binding material roll 42, 43 received in the respectively active roll receptacle 22, 26 rotates about a binding material roll axis A1, A2 while the binding material 44, 45 is being unwound. In order to tauten and stretch the unwound binding material 44, 45, the rotational movement of the binding material roll 42, 43 is braked. To this end, a brake unit 35 is provided. Said brake unit has, as an essential element, a brake roll 37, which is mounted on a brake mount 36 so as to be rotatable about a brake roll axis of rotation B. The brake mount 36 is, in turn, connected to the binding housing 21 so as to be pivotable about a brake unit pivot axis C. The mentioned axes B, C each run parallel to the transverse axis Y. FIGS. 1 to 4 each show the brake unit 35 in a first braking position D1 assigned to the first roll receptacle 22. In this state, the first binding material roll 42 is not supported by the first support finger 25, but rather exclusively by the first support roll 23 and the brake roll 37. As can be seen in particular in FIG. 2, the brake roll 37 has a plurality of cutouts 38. These are spaced apart from one another with respect to the brake roll axis of rotation B, wherein they are of tangentially encircling form and extend radially inwards. Their size and position are coordinated such that a respective support finger 25 can be received in a cutout 38, as illustrated in FIG. 4, in which the section plane runs through one of the cutouts 38. Since the support fingers 25 can be received in the cutouts 38, the brake roll 37 can protrude beyond the support fingers 25 in the direction of the binding material roll 42, such that the auxiliary support apparatus 24 is relieved of load overall.

The brake roll 37 is, for the one part, coupled to a sensor wheel 40, which cooperates with a rotational speed sensor 41, which can be used to ascertain the rotational speed of the brake roll 37 and, thus, the speed of the binding material 44. For the other part, the brake roll 37 is coupled to a brake 39, which is visible in FIG. 3 and which in this case, is in the form of an electric brake but could, for example, also be in the form of a hydraulic brake. The braking force and, thus, the braking torque exerted by the brake roll 37 can be set by way of the brake 39.

If the user wishes to use the binding material roll 43 in the second roll receptacle 26 instead of the binding material roll 42 in the first roll receptacle 22, the brake unit 35 has to be adjusted. To this end, the brake unit 35 as a whole is pivoted about the brake unit pivot axis C, the brake roll 37 moving along a circular-arc-shaped adjustment path E illustrated in FIG. 3. In this case, a locking mechanism (not illustrated in the figures) which holds the brake roll 37 in the first braking position D1 must firstly be released. When the brake roll 37 is moved out of the first braking position D1, the support fingers 25 pass through the corresponding cutouts 38, such that no collision occurs. That side of the binding material roll 42, which was supported by the brake roll 37, moves downwards slightly (for example, by a few millimeters or a few centimeters) until it rests on the support fingers 25. As a result of the pivoting of the brake unit 35, the brake roll 37 finally passes into the second braking position D2, illustrated in FIG. 5, and assigned to the second roll receptacle 26. Here, the support fingers 29 of the associated second auxiliary support apparatus 28 are, in turn, received in the cutouts 38 and finally completely relieved of load. To this end, the one side of the binding material roll 43 has to be moved upwards slightly (for example, by a few millimeters or centimeters). The brake unit 35 can then be secured in the second braking position D2 by means of a locking mechanism (also not illustrated). The user can unwind binding material 45 from the binding material roll 43 and, as illustrated in FIG. 5, guide it via the deflection rolls 31 to the feed jaw 32.

Overall, the change between the different binding material rolls 42, 43 can be implemented with a single brake unit 35 and a single feed unit 30. The heavy and cumbersome binding material rolls 42, 43 remain substantially in position in the process, apart from the described slight raising, such that the overall change can be carried out manually by a user. However, as an alternative, an actuator could also be provided in order to adjust the brake unit 35 between the braking positions D1, D2.

From the foregoing, it can be seen that the present invention accomplishes at least all of the stated objectives.

LIST OF REFERENCE CHARACTERS

The following table of reference characters and descriptors are not exhaustive, nor limiting, and include reasonable equivalents. If possible, elements identified by a reference character below and/or those elements which are near ubiquitous within the art can replace or supplement any element identified by another reference character.

TABLE 1

| | List of Reference Characters |
|---|---|
| 1 | Round baler |
| 2 | Frame |
| 4 | Drawbar |
| 7 | Wheels |
| 8 | Auxiliary wheels |
| 9 | Pressing apparatus |
| 10 | First roller |
| 11 | Second roller |
| 12 | Pressing belts |
| 13 | Pressing chamber |
| 20 | Binding unit |
| 21 | Binding housing |
| 22 | First roll receptacle |
| 23 | First support roll |
| 24 | First auxiliary support apparatus |
| 25 | First support finger(s) |
| 26 | Second roll receptacle |
| 27 | Second support roll |
| 28 | Second auxiliary support apparatus |
| 29 | Second support fingers |
| 30 | Single feed unit |
| 31 | Deflection rolls |
| 32 | Feed jaw |
| 33 | Actuator |
| 35 | Brake unit |
| 36 | Brake mount |
| 37 | Brake roll |
| 38 | Cutouts |
| 39 | Brake |
| 40 | Sensor wheel |
| 41 | Rotational speed sensor |
| 42 | First binding material roll |
| 43 | Second binding material roll |
| 44 | First binding material |
| 45 | Second binding material |
| 46 | Pickup |
| 47 | Feed rotor |
| 50 | Bale (finished or rotating) |
| A1 | First binding material roll axis |
| A2 | Second binding material roll axis |
| B | Brake roll axis of rotation |
| C | Brake unit pivot axis |
| D1 | First braking position |
| D2 | Second braking position |
| E | Circular arc-shaped adjustment path |
| F | Direction of travel |
| X | Longitudinal axis |
| Y | Transverse axis |
| Z | Vertical axis |

Glossary

Unless defined otherwise, all technical and scientific terms used above have the same meaning as commonly understood by one of ordinary skill in the art to which embodiments of the present invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein, refers to slight variations in numerical quantities with respect to any quantifiable variable. Inadvertent error can occur, for example, through the use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes a structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the present invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The invention claimed is:

1. A round baler (1) comprising of:
   a pressing apparatus (9) for pressing agricultural crops into a bale (50) in a pressing chamber (13);
   a binding unit (20), having a binding housing (21), a plurality of roll receptacles (22, 26) which are at least partially arranged in the binding housing (21), and which are each intended to rotatably receive a binding material roll (42, 43);
   a feed unit (30) by which binding material (44, 45) from a respective active roll receptacle (22, 26), which can be selected from the plurality of roll receptacles (22, 26), can be introduced in the direction of the pressing chamber (13); and
   a brake unit (35) which is configured to at least indirectly cooperate with said binding material rolls (42, 43) so as to brake it, wherein the brake unit (35) can be adjusted relative to the binding housing (21) between a plurality of braking positions (D1, D2), wherein each roll receptacle (22, 26) is assigned at least one of the plurality of braking positions (D1, D2), and, in the assigned braking position (D1, D2) assigned to the active roll receptacle (22, 26), the brake unit (35) is configured to at least indirectly cooperate with the binding material roll (42, 43) received in the active roll receptacle (22, 26) in order to brake it.

2. The round baler (1) according to claim 1 wherein the brake unit (35) has a brake roll (37) that is mounted so as to be rotatable about a brake roll axis of rotation (B) and which is configured to engage radially on an outer side of the binding material roll (42, 43) in order to brake it.

3. The round baler (1) according to claim 2, wherein the brake roll (37) can be adjusted, guided along a defined adjustment path (E), between two braking positions (D1, D2).

4. The round baler (1) according to claim 2, wherein the brake roll (37) can be adjusted along an at least partially arcuate adjustment path (E).

5. The round baler (1) according to claim 2, wherein the brake unit (35) has a brake mount (36) on which the brake roll (37) is mounted so as to be rotatable about the brake roll axis of rotation (B) and which is mounted on the binding housing (21) so as to be pivotable about a brake unit pivot axis (C) which is offset relative to the brake roll axis of rotation (B).

6. The round baler (1) according to claim 2, wherein in that, in the assigned braking position (D1, D2), the brake roll (37) is configured to at least partially support the binding material roll (42, 43) received in the active roll receptacle (22, 26).

7. The round baler (1) according to claim 2, wherein the at least one roll receptacle (22, 26) has a support roll (23, 27) which is mounted on the binding housing (21) in a positionally fixed manner, and which is configured to support the binding material roll (42, 43) together with the brake roll (37).

8. The round baler (1) according to claim 2, wherein the at least one roll receptacle (22, 26) has an auxiliary support apparatus (24, 28) which is configured to at least partially support the binding material roll (42, 43) when the brake roll (37) is arranged outside the assigned braking position (D1, D2).

9. The round baler (1) according to claim 8, wherein the at least one auxiliary support apparatus (24, 28) has a plurality of support fingers (25, 29) which are spaced apart parallel to the brake roll axis of rotation (B), and which are configured to support the binding material roll (42, 43) in each case proportionately.

10. The round baler (1) according to claim 8, wherein in that the auxiliary support apparatus (24, 28) is rigidly connected to the binding housing (21).

11. The round baler (1) according to claim 8, wherein the brake roll (37) has at least one cutout (38) which runs in encircling fashion tangentially with respect to the brake roll axis of rotation (B), which is axially delimited, which extends radially inwards and in which the auxiliary support apparatus (24, 28) is at least partially received in the assigned position (D1, D2) of the brake roll (37).

12. The round baler (1) according to claim 8, wherein in the assigned braking position (D1, D2), the brake roll (37) protrudes beyond the auxiliary support apparatus (24, 28) in the direction of the binding material roll (42, 43), such that the auxiliary support apparatus (24, 28) is completely relieved of load.

13. The round baler (1) according to claim 1, wherein the feed unit (30) has a plurality of guide elements (31, 32) for binding material (44, 45) which are at least predominantly able to be used together with the active roll receptacle (22, 26).

14. A binding unit (20) for a round baler (1) comprising of:

a pressing apparatus (9) for pressing agricultural crops into a bale (50) in a pressing chamber (13), wherein the binding unit (20) has a binding housing (21), a plurality of roll receptacles (22, 26) which are at least partially arranged in the binding housing (21), and which are each intended to rotatably receive a binding material roll (42, 43);

a feed unit (30) by which binding material (44, 45) from a respective active roll receptacle (22, 26), which can be selected from the plurality of roll receptacles (22, 26), can be introduced in the direction of the pressing chamber (13); and a brake unit (35) which is configured to at least indirectly cooperate with said binding material roll (42, 43) so as to brake it, wherein the brake unit (35) can be adjusted relative to the binding housing (21) between a plurality of braking positions (D1, D2), wherein each roll receptacle (22, 26) is assigned at least one of the plurality of braking positions (D1, D2), and, in the assigned braking position (D1, D2) assigned to one of the roll receptacles (22, 26), the brake unit (35) is configured to at least indirectly cooperate with the binding material roll (42, 43) received in this roll receptacle (22, 26) in order to brake it.

* * * * *